United States Patent [19]

Mercier

[11] 3,946,759

[45] Mar. 30, 1976

[54] PRESSURE VESSEL HAVING A DEFORMABLE BLADDER THEREIN

[76] Inventor: Jacques H. Mercier, 49 Rue de Naples, Paris, France

[22] Filed: June 26, 1974

[21] Appl. No.: 483,305

Related U.S. Application Data

[62] Division of Ser. No. 224,801, Feb., 1972, Pat. No. 3,830,259.

[52] U.S. Cl. ..................... 138/30; 92/92; 92/103 R
[51] Int. Cl.² .......................................... F16L 55/04
[58] Field of Search........... 138/30; 92/92, 98 D, 92/98 R103 R

[56] References Cited
UNITED STATES PATENTS

| | | | |
|---|---|---|---|
| 2,378,467 | 6/1945 | De Kiss | 138/30 |
| 2,389,791 | 11/1945 | Lippincott | 138/30 |
| 2,389,792 | 11/1945 | Lippincott | 138/30 |
| 2,397,796 | 4/1946 | Lippincott | 138/30 |
| 3,067,776 | 12/1962 | Love | 138/30 |
| 3,654,964 | 4/1972 | Mercier et al. | 138/30 |

Primary Examiner—Richard C. Queisser
Assistant Examiner—Charles Gorenstein
Attorney, Agent, or Firm—Arthur B. Colvin

[57] ABSTRACT

This invention relates to a pressure vessel and more particularly to a pressure accumulator of the type including a rigid container having a pair of ports at its respective ends with a deformable partition or bladder therein having a mouth at one end affixed to one of said ports, said bladder separating two fluids such as gas or liquid under pressure in said container.

The bladder is of the type formed from two separate sections, each substantially cup-shaped, so that when the rims of the sections are joined, a closed container will be formed.

As the bladder expands to force liquid from the other port of the container, stress will be imparted to the wall of the bladder as a result of the stretching thereof, and such bladder wall is conformed to minimize the stress that would otherwise be imparted to the junction between the two sections of the bladder.

1 Claim, 5 Drawing Figures

PRESSURE VESSEL HAVING A DEFORMABLE BLADDER THEREIN

This application is a division of copending application Ser. No. 224,801, filed Feb. 9, 1972 now U.S. Pat. No. 3,830,259, Aug. 20, 1974.

As conducive to an understanding of the invention, it is noted that a conventional pressure accumulator generally includes a rigid container having a pair of ports at its respective ends, and having a deformable partition in the form of an elongated bladder having a mouth at one end secured to one of said ports and separating two fluids such as gas and liquid under pressure charged into the accumulator.

To facilitate manufacture of the bladder, it is desirable that it be formed from two substantially cup-shaped sections, one of the sections having a gas fitting molded at the end thereof and extending axially therefrom, the rims of the two cup-shaped sections being secured together in any suitable manner, such as bonding by hot or cold valcanization or by the use of adhesives with or without heat treatment. For facility in describing the invention, such connected junction between the two rims will be hereinafter referred to as the bonded zone.

In addition to the bonded zone being at the junction of the two rims of the bladder sections, the invention may also be applied to the bonded zone at the junction of a valve member, particularly a rigid button, to the end of the bladder, which valve member cooperates with the liquid port of the pressure vessel.

The bladder of a pressure accumulator is designed to be charged with gas under pressure and to react against a liquid such as oil charged into the container through the liquid port so that when the port is subsequently opened, the bladder will expand to force the liquid out of the liquid port to actuate the components of the hydraulic system in which the pressure accumulator is utilized.

It is apparent that since the bladder normally, in its inflated but undistended condition, is of length considerably shorter than the container to prevent premature closing of the liquid port before all of the liquid in the container is forced therefrom, as the bladder expands in use, the wall thereof will be subjected to considerable stress and such stress will of course be imparted to the bonded zone above referred to.

Since the bonded zone in fact forms a discontinuity in the integral wall of the bladder, in order to strengthen the bonded zone it would be necesssary to increase the surface area of the bond and to use a cement or other means of adhesion that is as strong as possible.

Unfortunately, due to the physical size of the bladder wall, it is not always possible or desirable to have a bonded zone covering a large area.

Thus, where the bonded area involves the adjacent rims of two sections of the bladder, these rims can be bevelled so as to define an oblique bonding area.

Obviously, the bonded area can be increased by bevelling such rims so that the bevelled parts extend almost parallel to the wall of the bladder. However, manufacturing limitations do not generally permit a bonded area with surfaces almost parallel to the wall of the bladder and in practice the slope of the abutting rims is based on the physical configuration of the bladder wall itself.

In addition, where the bonded zone is formed between the bladder and another element such as a valve member, the dimensions of the bonded area is based upon the area of the valve member, for example, which is available for bonding.

Furthermore, it is not always possible in many applications to use very high performance adhesives or cements since the material from which the bladder is made, such as natural rubber, or plastics, may not be compatible with such cement or adhesives and in addition it may not be compatible with the particular liquid being used in the accumulator.

Furthermore, the cost of adhesives that might be compatible might be prohibitive.

It is accordingly among the objects of the invention to provide a bladder for use in a pressure vessel, which has a bonded zone that is subjected to stress during operation and which bladder is conformed to minimize the stress imparted to such bonded zone without need for having a bonded zone of large area or employ an adhesive or bond of high performance.

According to the invention, a partition or bladder is positioned in a rigid container to separate two fluids therein and is affixed in the container in such manner that the bladder defines two chambers for such fluids.

The bladder has a bonded zone which is formed either by the junction of two sections of the bladder or by the junction of a valve member to the bladder.

The wall of the bladder adjacent the bonded zone has a stress relief zone which at least partially relieves the bonded zone from stresses that would otherwise be applied thereto during operation. More particularly, such stress relief is accomplished by a reduction of the thickness of the bladder wall.

According to one embodiment of the invention, the width of the stress relief zone is at least equal to that of the bonded zone and the distance separating said zones is less than twice the width of the bonded zone to be protected.

As a result of the above arrangement, the stress on the bladder wall resulting from expansion of the bladder during operation will be primarily absorbed by the stress relief zone due to its reduced thickness.

Consequently, the area of the bonded zone is not critical and the bond material used need not be of a high performance high cost material, but only need satisfy the condition that it is compatible with the material of the bladder and the liquid used in the pressure vessel.

In the accompanying drawings in which are shown one or more of various possible embodiments of the several features of the invention:

Figure 1:
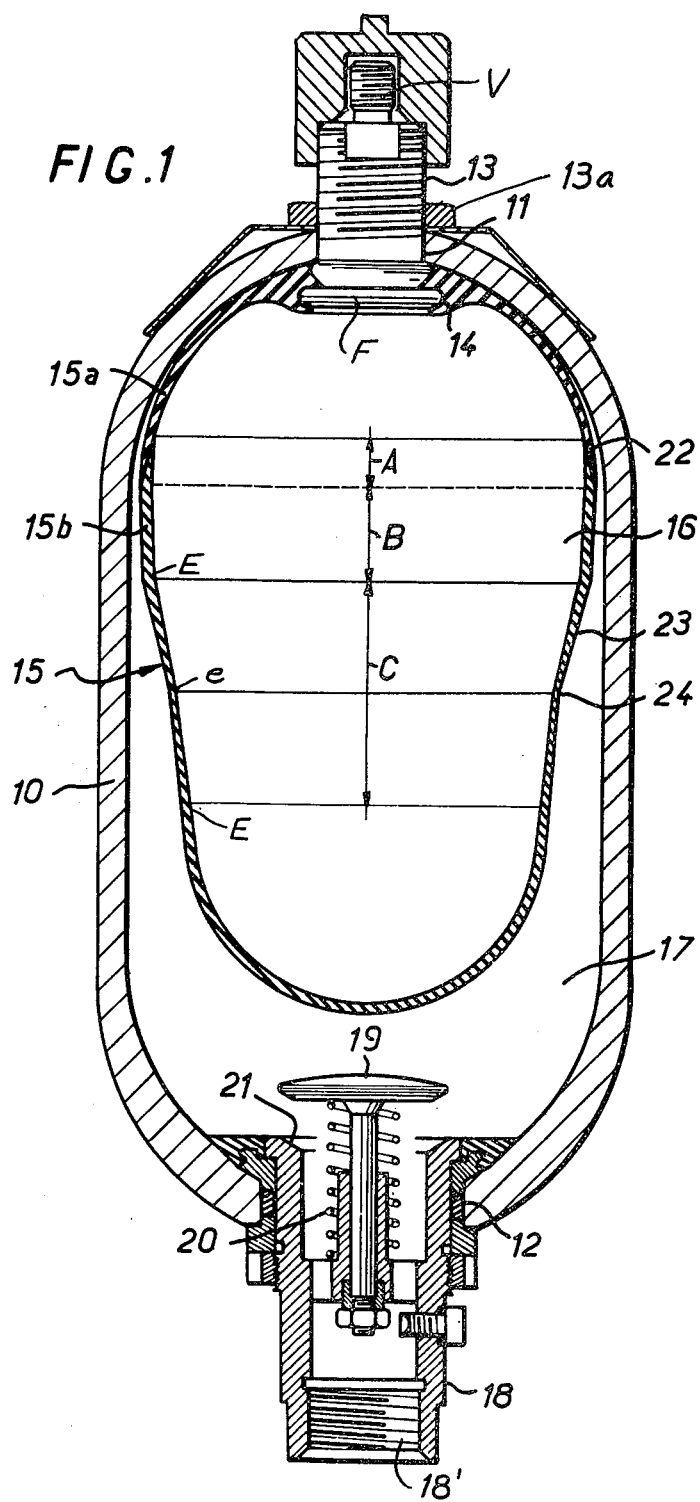
FIG. 1 is a longitudinal sectional view of a pressure accumulator according to the invention in which the bonded zone to be protected is located between two sections of the bladder.

Referring now to the drawings, there is shown in FIG. 1 a pressure accumulator comprising a rigid container 10 of steel or aluminum, for example, capable of withstanding relatively high pressure. The container 10 has a cylindrical body portion with substantially hemispherical ends, each having a port 11 and 12. The ports 11 and 12, which are axially aligned, define a gas port and a liquid pot respectively.

Positioned in the gas port is an externally threaded fitting 13 which has an axial bore therethrough, said fitting having an annular flange F at its inner end and protrudes outwardly from said port 11. A nut 13a screwed on the protruding end of said fitting 13 securely retains the latter in said port 11.

A deformable separator, illustratively a bladder 15 of rubber or similar material having like characteristics, is positioned in said container 10, to divide the latter into two chambers 16 and 17. One of the chambers 16 defines a gas chamber which is in communication with the bore of fitting 13, the bore having a conventional valve V such as a "Schrader" valve at its outer end, for charging of the chamber 16 with gas under pressure.

The bladder 15 has a mouth 14 which is secured as by bonding to the annular flange F of fitting 13.

The port 12 releasably mounts a poppet valve assembly comprising a sleeve 18 which protrudes outwardly from port 12 and is internally threaded as at 18' for connection to the hydraulic system with which the pressure accumulator is associated. The inner end of sleeve 18, which protrudes into the container, is beveled at 21 to define a seat for the poppet valve 19, the latter normally being urged away from its seat by coil spring 20 and being designed to be moved against the seat 21 when the bladder expands.

In operation, gas under pressure is forced through valve V to charge the chamber 16 with a predetermined pre-load. As a result, the bladder 15 which in inflated but undistended condition, is of size smaller than the container 10, will expand against the entire inner surface of the container 10 and close the valve 19.

A liquid such as oil is then introduced through the bore 18' of sleeve 18 under a pressure greater than the pre-load pressure in bladder 15 causing the latter to compress the gas contained in chamber 16. Thereupon a valve (not shown) positioned between sleeve 18 and the hydraulic system is closed. Thus, chamber 17 will contain a volume of oil under high pressure which is available for use when such valve is opened.

As the construction and operation of the pressure accumulator thus described is conventional and well known to those skilled in the art, it will not be further described except as is necessary for a clear understanding of the invention.

From the above description, it is apparent that the bladder 15 will be subjected to stresses, particularly when it expands and stretches to force oil from the container.

Figure 4:
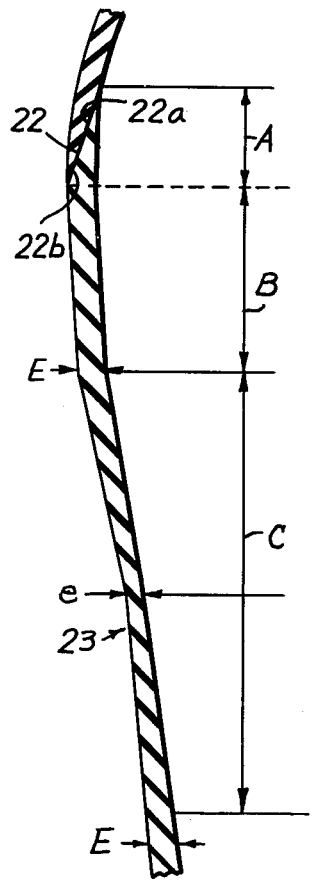
FIG. 4 is a detail view on an enlarged scale showing the bonded zone and relief zone of FIG. 1.

In the embodiment shown in FIGS. 1 and 4, the bladder is relatively long and is formed from two sections 15a, 15b joined as at 22. More particularly, the sections 15a and 15b are substantially cup-shaped and the junction 22 at which they are joined, is in the form of an annulus or band whose width measured along the axis of container 10 is shown at A in FIGS. 1 and 4.

As is clearly shown in FIG. 4, adjacent rims of the sections 15a, 15b are bevelled as at 22a, 22b and the juxtaposed faces 22a, 22b which are complementary, are bonded or cemented together to form a bonded zone that extends obliquely. Such inclination of the junction 22 affords a greater bonding area than would be present if the rims of section 15a, 15b were parallel to each other in a plane perpendicular to the axis of the bladder.

The junction or bonded zone 22 between the two rims 22a, 22b may be formed in any suitable manner, such as bonding by hot or cold vulcanization or by the use of adhesives with or without heat treatment or the like.

Figure 4A:
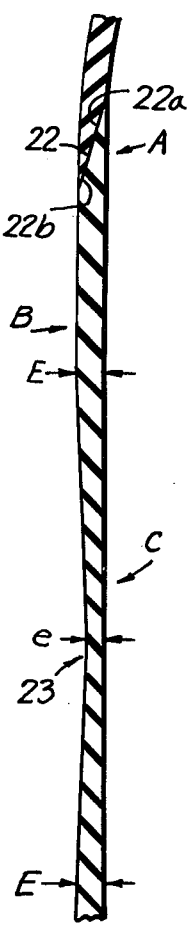
FIG. 4a is a schematic representation in rectilinear development of the portion of the bladder shown in FIG. 4 during expansion thereof.

The bonded zone 22 must resist the force or stress applied thereto during movement of the bladder 15 and particularly during expansion or stretching of the bladder 15 which tends to pull the surfaces 22a and 22b away from each other, the form of the bladder when it stretches being shown schematically in FIG. 4a.

According to the invention, the bladder 15 as is shown in FIGS. 1 and 4, is provided with a stress relief zone 23 adjacent the bonded zone 22 to be protected, the function of the zone 23 being to absorb the majority of the stretch imparted to the bladder wall during expansion thereof so that a minimum amount of stretch will be imparted to the bonded zone 22.

The stress relief zone 23 is formed by reducing the thickness of the bladder wall and for the stress relief zone to be effective it must be of substantial dimensions.

More particularly, as is clearly shown in FIGS. 1 and 4, the width of the bonded zone 22 is identified by the letter A along the longitudinal axis of the bladder.

The width of the stress relief zone 23 is identified by the letter C along the longitudinal axis of the bladder and the distance separating the zones 22 and 23 is identified by the letter B along the longitudinal axis of the bladder.

In the preferred embodiment shown, the width C of the stress relief zone is at least equal to and preferably greater than the width A of the bonded zone 22 to be protected and as shown, the width C is approximately four times the width of A.

It is desirable that the stress relief zone 23 be relatively close to the bonded zone 22 so that it can be more effective in relieving the stress. In practice it has been found that efficient results are obtained when the distance B along the longitudinal axis of the bladder separating the zones A and C is slightly less than twice the width of the zone A and in the illustrative embodiment shown, the width B is approximately 1.7 the width A.

As shown in FIGS. 1 and 4, the reduction in thickness of the portion of the bladder wall that forms the stress relief zone 22, is gradual from the extremities E of this zone 23 to its mid-portion e, also designated by the reference numeral 24, where the thickness of the bladder wall is approximately one-third or one-half the thickness of the bladder wall E.

As a result of such gradual reduction in thickness, there is a substantial wall thickness at e, so that likelihood of tearing of the bladder while stretching is substantially precluded.

Thus, in operation of the pressure accumulator, according to the invention, as the bladder 15 expands, due to the reduced wall thickness at the stress relief zone 23, the bladder wall will stretch more at such zone than at the remaining portions thereof, so that the stress on the bonded surfaces 22a and 22b will be minimized.

Figure 2:
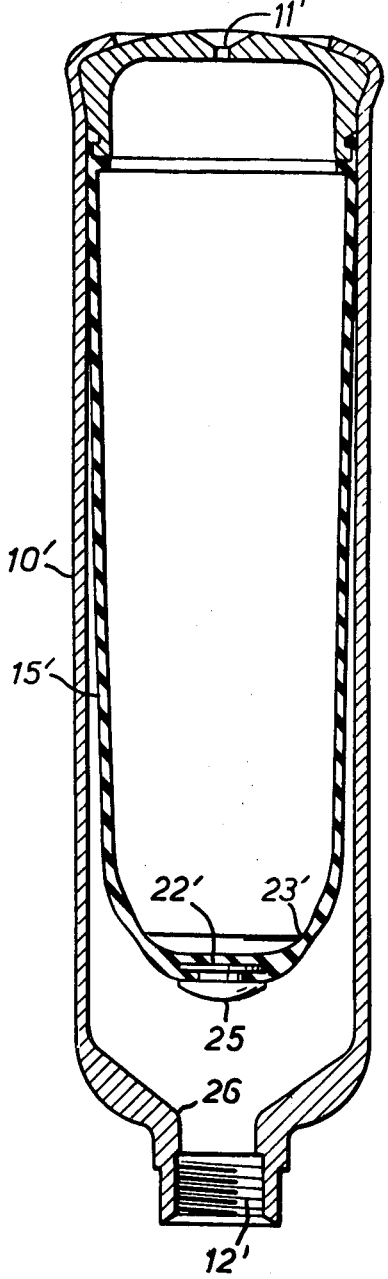
FIG. 2 is a view similar to FIG. 1 of another embodiment of the invention in which the bonded zone to be protected is located between the bladder and a valve member.
Figure 3:
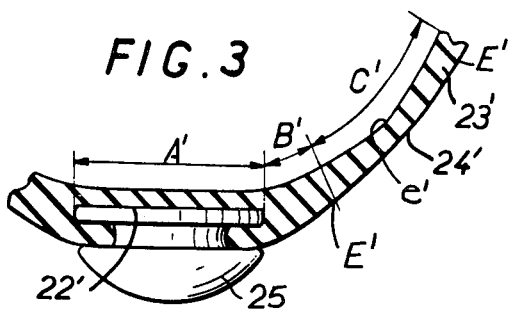
FIG. 3 is a detail view on an enlarged scale showing the bonded zone and relief zone of FIG. 2.

In the embodiment of the invention shown in FIGS. 2 and 3, elements similar to those in FIGS. 1 and 4 have the same reference numerals primed.

Referring to FIGS. 2 and 3, the bladder 15' is positioned in a rigid container 10' having a gas port 11' at one end and a liquid port 12' at its other end.

The bladder 15' mounts a valve member 25 at its free end, which valve member is designed to move against annular seat 26 to close the port 12' when the bladder expands in use.

The valve member 25 is bonded as at 22' to the end of the bladder, such area 22' being the bonded zone identified by the letter A'.

The end of the bladder has a stress relief zone 23' also identified by the letter C', the thickness of the bladder wall being more at the ends E' of zone 23' than at the mid portion $e'$ of said zone 23' identified by the numeral 24'.

As described with respect to the embodiment of FIGS. 1 and 4, the stress relief zone 23' of FIGS. 2 and 3 serves to relieve the bonded zone 22' from the stress resulting from expansion and stretching of the bladder in use.

In the embodiment of FIGS. 2 and 3, the width or distance C' is slightly greater than the distance A' while the width or distance B' is approximately one-third of the distance A'.

The wall thickness of the bladder at $e'$ is approximately one-third or one-half the wall thickness at E'.

The reduced thickness of the bladder wall can be in a symmetrical manner as shown in FIGS. 1 and 4, or in an offset manner as shown in FIGS. 2 and 3, in which the thinning is on the inside of the bladder, but it can also have any other suitable configuration.

Having thus described my invention, what I claim as new and desire to secure by Letters Patent of the United States is:

1. As an article of manufacture, a bladder for a pressure vessel of the type comprising a rigid hollow container having axially aligned ports, said bladder intervening between said ports and defining two chambers in communication respectively with said ports, said bladder being of resilient deformable material and comprising two substantially cup-shaped sections, each having a rim, means connecting the rims of said sections to define a bond zone therebetween which is subject to the stresses imparted to the bladder as a result of the stretching thereof in operation, characterized by said bladder having in proximity to said bond zone, a stress relief zone, the width of said stress relief zone being at least equal to that of the bond zone and the distance separating said zones being less than twice the width of said bond zone, said stress relief zone being adapted substantially to absorb the stresses resulting from stretching of the bladder, to which the bond zone would otherwise be subjected, said bladder having a reduced wall thickness defining said stress relief zone, the latter comprising a decreasing thickness zone spaced from the bond zone immediately followed by an increasing thickness zone, the thickness of the portion of the bladder wall defining said stress relief zone being gradually reduced from the extremities of the stress relief zone to the middle portion thereof, the thickness of the bladder wall at the middle portion of the stress relief zone being between one-third to one-half the thickness of the bladder wall at the extremities of said stress relief zone.

* * * * *